United States Patent
Sagastegui

(10) Patent No.: US 7,351,898 B2
(45) Date of Patent: Apr. 1, 2008

(54) COLOR-GUIDING MUSIC TEACHING SYSTEM INCLUDING PRACTICE PAD, PITCH PLATES, PERCUSSION TARGETS & LESSON BOOK ASSEMBLY AND METHOD

(76) Inventor: John Sagastegui, 2334 Ave. Marejada, San Clemente, CA (US) 92673

( * ) Notice: Subject to any disclaimer, the term of this patent is extended or adjusted under 35 U.S.C. 154(b) by 39 days.

(21) Appl. No.: 10/928,594

(22) Filed: Aug. 27, 2004

(65) Prior Publication Data
US 2005/0045024 A1 Mar. 3, 2005

Related U.S. Application Data

(60) Provisional application No. 60/499,221, filed on Aug. 29, 2003.

(51) Int. Cl.
*G10D 13/02* (2006.01)
(52) U.S. Cl. .................................... 84/411 R
(58) Field of Classification Search .............. 84/411 R, 84/421, 420, 411 P
See application file for complete search history.

(56) References Cited

U.S. PATENT DOCUMENTS

| | | | | |
|---|---|---|---|---|
| 2,338,816 A | * | 1/1944 | Lockhart | 84/411 R |
| 2,565,225 A | * | 8/1951 | Gladstone | 84/411 R |
| 4,214,504 A | * | 7/1980 | Rex | 84/411 R |
| 5,520,090 A | * | 5/1996 | Eagle | 84/411 P |
| 5,892,169 A | * | 4/1999 | Shapiro | 84/411 M |
| 5,973,247 A | * | 10/1999 | Matthews | 84/402 |
| 5,998,716 A | * | 12/1999 | Marquez et al. | 84/411 P |
| 6,063,992 A | * | 5/2000 | Schwagerl | 84/411 P |
| 6,399,869 B1 | | 6/2002 | Sagastegui | 84/738 |
| 6,518,490 B2 | * | 2/2003 | Good | 84/414 |
| 6,525,259 B2 | * | 2/2003 | Sagastegui | 84/738 |
| 2004/0154458 A1 | * | 8/2004 | Coleman | 84/470 R |

* cited by examiner

*Primary Examiner*—Gary F. Paumen
(74) *Attorney, Agent, or Firm*—Shimokaji & Associates, P.C.

(57) ABSTRACT

A Color-guiding Music Teaching System including practice pad, pitch plates, percussion targets & lesson book assembly and method is disclosed. The teaching method enables young students to learn music much faster than before by creating an association between musical notes, audible pitch, visual appearance and tactile feel. Several devices are provided, ranging from simple striking targets to more complex musical instruments that have visually, possibly audibly, and even possibly tactilely distinct striking targets incorporated or attached thereto to accompany execution of the teaching method.

22 Claims, 12 Drawing Sheets

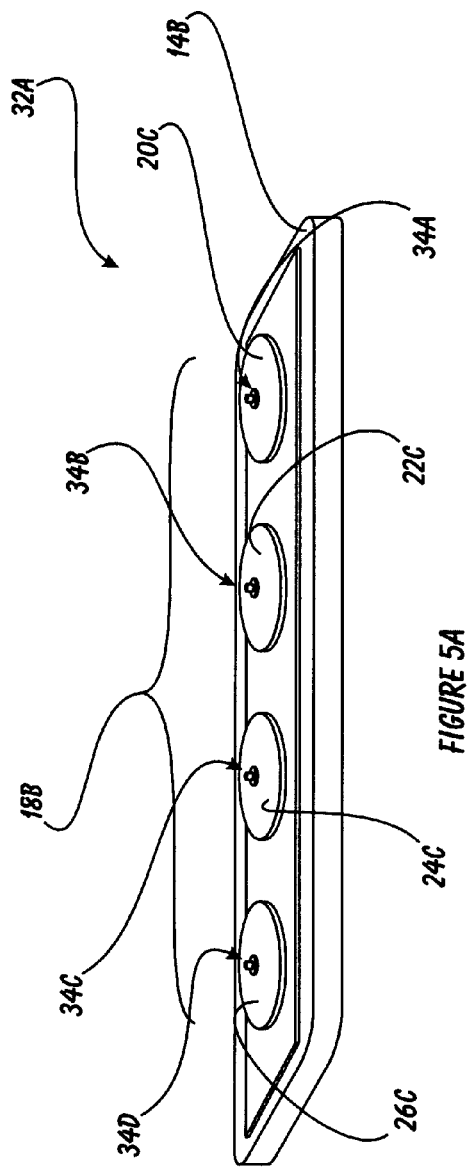
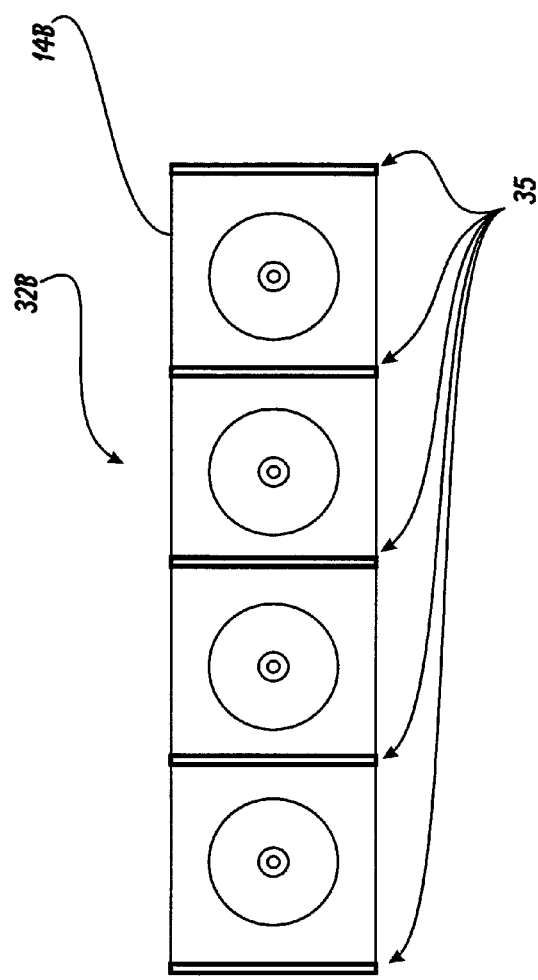
FIGURE 5A
FIGURE 5B

US 7,351,898 B2

COLOR-GUIDING MUSIC TEACHING SYSTEM INCLUDING PRACTICE PAD, PITCH PLATES, PERCUSSION TARGETS & LESSON BOOK ASSEMBLY AND METHOD

This application is filed within one year of, and claims priority to Provisional Application Ser. No. 60/499,221, filed Aug. 29, 2003.

BACKGROUND OF THE INVENTION

1. Field of the Invention

This invention relates generally to musical instruments and teaching methods therefore and, more specifically, to a Color-guiding Music Teaching System including practice pad, pitch plates, percussion targets & lesson book assembly and method.

2. Description of Related Art

For over 3,000 years, people have been studying the elements of Music, and it's relationship to math and science. Even more so, the use of notations, inscriptions, symbols, and other elements of structuring written Music were used over 5,000 years ago by the Egyptians. In order to better translate Music from "playing it" as to "writing it," a language had to be invented in order for various people to exchange their thoughts. Similar to a Vocal Language, speaking a "language" compared to reading and writing it, can be viewed as two mentally distinct human-functions. For example, a child can begin speaking words and communicating sentences at an early age, (i.e., toddler), however, the child doesn't begin to learn how to read and write what he is saying until later, such as beginning pre-school or kindergarten. Therefore, Music should be considered in this same regard.

Traditionally, Music has been taught in most schools beginning at $3^{rd}$ grade. There is an illusion of it being too complex for a child, because the reading and writing of Music involves higher levels of mathematics. Even though higher levels of math are used, society's preconception is reversed. People think: "the Knowledge of Math helps to comprehend Music," however, the truth is that "the Knowledge of Music helps to comprehend Math."

The ease of making Music should not be compared to the complexity of reading and writing it. Even a child at an early age such as 3 or 4 can learn how to make Music similar to teaching this child how to speak a new language, such as a few words of Spanish or even teaching them how to talk in a second language.

SUMMARY OF THE INVENTION

In light of the aforementioned problems associated with the prior devices and methods, it is an object of the present invention to provide a Color-guiding Music Teaching System: practice pad, pitch plates, percussion targets & lesson book assembly and method. The teaching method should enable younger students to learn music much faster than before by creating an association between musical notes, audible pitch, visual appearance and tactile feel. Several devices should be provided, ranging from simple striking targets to more complex musical instruments that have visually, possibly audibly, and even possibly tactilely distinct striking targets incorporated or attached thereto to accompany execution of the teaching method.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 5A and 5B are perspective and top views, respectively of a preferred embodiment of a pitch plate practice device of the present invention;

DETAILED DESCRIPTION OF THE PREFERRED EMBODIMENTS

Figure 1A:
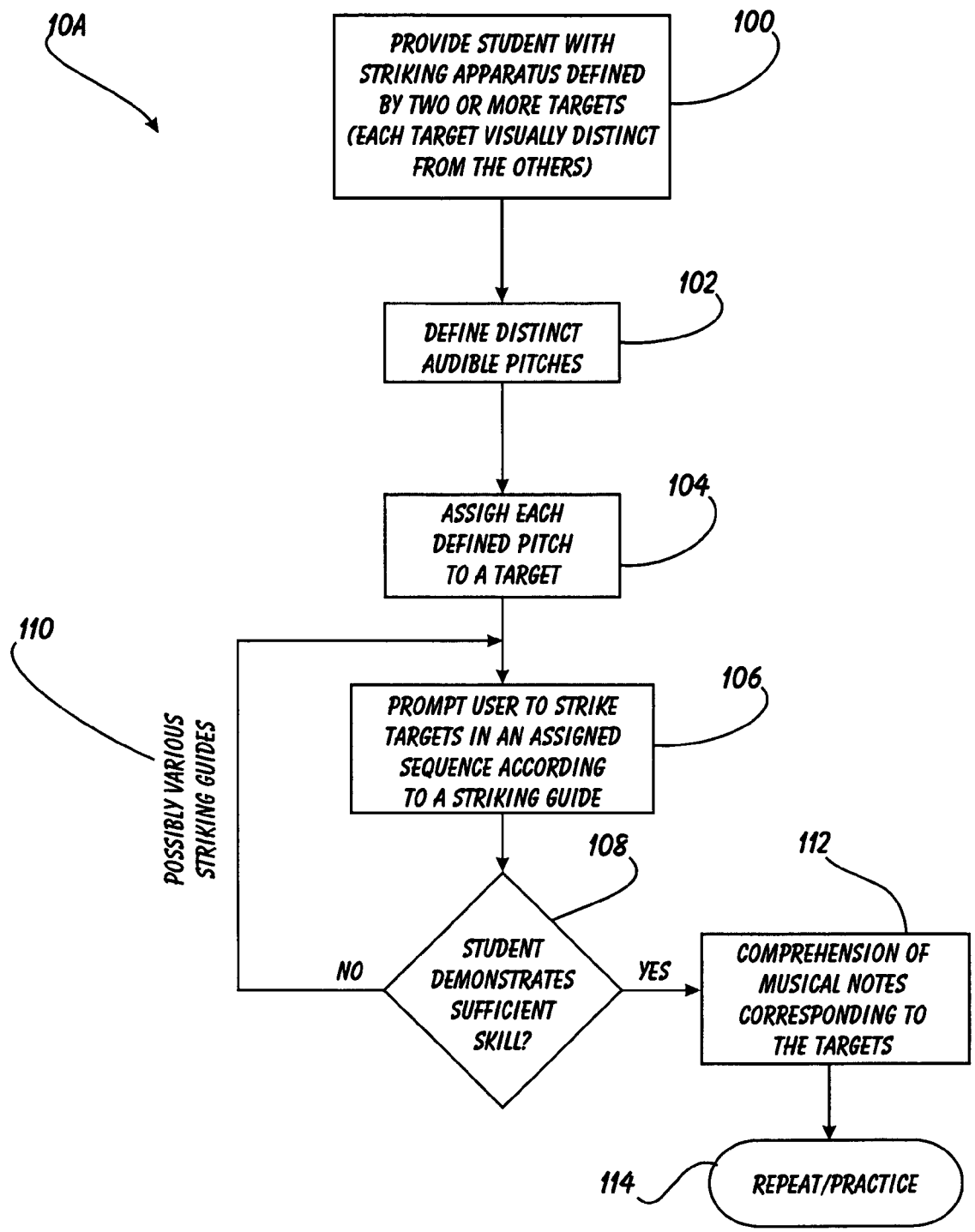
FIGS. 1A-1C are flowcharts depicting preferred teaching methods of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Color-guiding Music Teaching System including practice pad, pitch plates, percussion targets & lesson book assembly and method.

Theoretical Basis for the Method

Math can be used as an element to reveal the concepts of the "Music-language," and when used as such, we can begin to make some comparisons. Learning how to make Music can be compared to learning math. In math you first learn an introductory level, or Lower Math Level, and then you proceed to learn a Higher Math Level. Similar, there are two elements to create Music: Rhythm and Pitch. Rhythm can be considered the Lower Math, and Pitch being the Higher Math. For example, in beginning math it is taught that "Additions" and "Subtractions" are basics concepts of whole values. In mathematics these values are "Numbers," and in Music these values are moments in time, (i.e., "Rhythm"). Next, a more complex level is to compare each individual value against itself and against the others. In mathematics these are "Fractions," and in Music this is "Pitch."

The Color Spectrum has been around since the first day of time when the sun emitted its rays upon the earth, (i.e., "In the Beginning there was Darkness . . . and then there was Light.") Using the concepts of "Whole Values" as in Lower Math, along with the "Divisions of Pyramids" as seen in our Higher Math, we can analyze Music's infinite levels of Pitch and the endless shades of colors within the Color Spectrum.

By using the Color Spectrum for measuring the scale of ascending Sounds of Pitch we are able to expand even more on making the Music "come to life." First, we must utilize 4 distinct colors that are a good representation of the mixture of colors within a Color Spectrum, (i.e., Blue, Green, Red, & Yellow). Then, we can place the colors in the order of Darkest to Lightest in conjunction with the sound levels of a pitch. Thus, we can better view the same musical score from before within a truer formation of life.

Using an ascending scale of "Darker to Lighter Colors" representing the "Lower to Higher Sounds" can be particularly beneficial for teaching children how to understand the flow of Music. Similar to the audio stimuli we use to teach Music on a scale of Sounds and Pitches, we could also teach them using the visual stimuli of a Color Scale that correlates to Darker and Lighter colors. For example, a scale of temperatures can be correlated to a "visual" scale within a basic thermometer. Regardless of the application for the thermometer, its colors will always consist of ranging from the Lower temperatures to the Higher temperatures.

Therefore, to begin, we must divide the "one" Color Spectrum into "two" logical common pieces of an Ascending order, (i.e., Darker Colors to Lighter Colors). Once a sequential "ascending" order has been selected, the colors can then be compared in a "descending" order as well. In viewing the Color Spectrum we can see that half is Dark and the other is Light.

It is evident that the Color Spectrum can be divided into "two" common units of "Darker" to "Lighter Values" and they are within an ascending sequential order of "1 to 2." As we continue, we must remember that the "1" and "2" are only symbols, and only represent a placement within the Ascending Scale. So, moving to the next level of dividing the 2 pieces of the Color Spectrum into 4 pieces, we must first select 4 distinct colors that best represent the Color Spectrum and has a correlation between the 2 initial sides of (1) Dark Colors, and (2) Light Colors. Then, we need to identify the colors values within the Measurement Scale of Darkest to Lightest Colors.

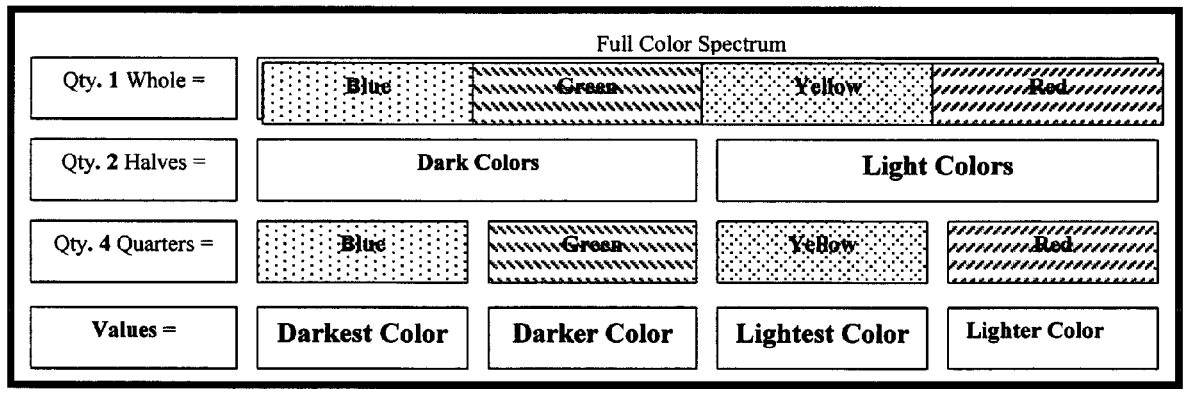

The above example shows us "4" distinct colors and their values that represent the "1" Color Spectrum. At this point we need to assign "symbols" (or numbers) to each value so that they can be placed on an ascending scale. However, when placing these colors (values) in ascending sequential order, they seem to differ from the Color Spectrum.

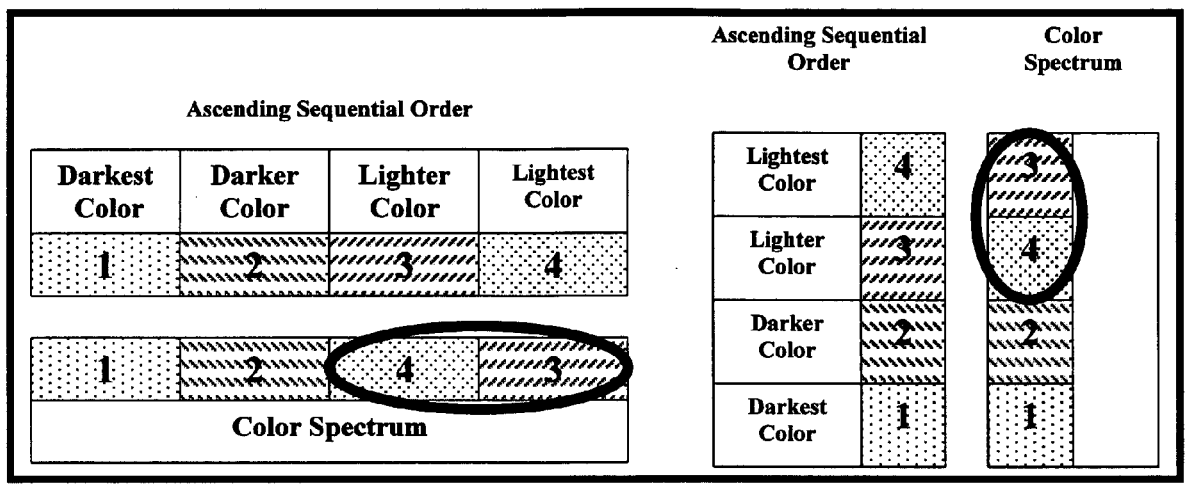

Physical Considerations

Medical research has shown that the average human hand and wrist has over 3,000 bones, muscles, nerves, and other organs that interact together and instantaneously when performing a specific hand motion or gesture. This is very evident when watching the precise body movements of a student that is playing a percussion instrument such as the Drums.

When playing a percussion instrument, a student holds a pair of drumsticks in their hands and strikes a Drum. The control of the drumstick is maintained within the student's fingers, and the mechanical movements of the wrist formulate the specific type of strokes being played. There are two types of strokes that are used to play a musical percussion note: an "Accent" Stroke, and a "Standard" Stroke, and both are differentiated by the intensity of the strike. An Accent Stroke consists of a harder hitting strike, and denotes a particular Higher Pitch within the rhythm of the Music, (i.e., Low Pitch=Standard Stroke; and High Pitch=Accent Stroke.)

By watching a detailed motion of an "exaggerated" stroke it is easily seen that when striking "Harder" your hand rises up in the air "Higher," and rises "Lower" when striking "Softer."

While actually playing the Drums, the hand has an appearance of being steadier, and some of the movements discussed above are almost invisible to the human eye. However, by duplicating these invisible-looking wrist movements, and exaggerating them with an upward and/or downward motion, we can create an MBR (Musical Body Reflex) scenario. This exaggerated motion builds a mental "reflex" for the beginning student, and helps them to remember when to strike an Accent or a Standard Strike. Thereby, almost "subconsciously" learning the rhythm, and conditioning the mind to hear the pitch.

The inventor has developed a Percussion Drum Pad that "imitates" this upward and downward movements of the wrist. This new Teaching Tool will exaggerate an Accent Stroke (Percussion High Note), and helps to develop a mental reflex using the "Visual, Tactile, and Audio Senses" and thus helps to remember a Rhythm, and differentiate a Pitch.

By dividing the 2 types of Strokes per both hands, we have developed a unit of four quadrants, (i.e., 2 Strokes+2 Hands=4). Each quadrant is placed as a "target" in relation to its mechanical wrist movement that is determined by the type of Strike per each Hand.

| Four-Quadrant Assembly: Beginning Percussion Practice Pad ||||||||
|---|---|---|---|---|---|---|---|
| 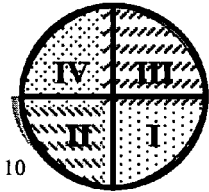 | Quadrant | Hand | Color | Tone | Texture | Location | Stroke |
| | Section IV | Left | Light | High Pitch | Hard | Top | Accent |
| | Section III | Right | Light | High Pitch | Hard | Top | Accent |
| | Section II | Left | Dark | Low Pitch | Soft | Bottom | Standard |
| | Section I | Right | Dark | Low Pitch | Soft | Bottom | Standard |

Figure 2:
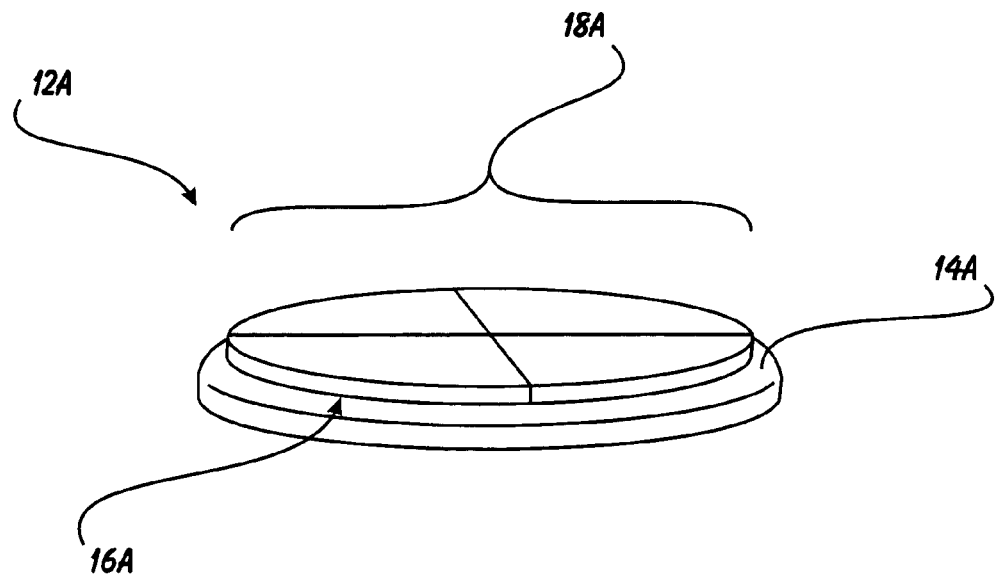
FIG. 2 is a perspective view of a preferred embodiment of a pitch pad practice device of the present invention.
Figure 3:
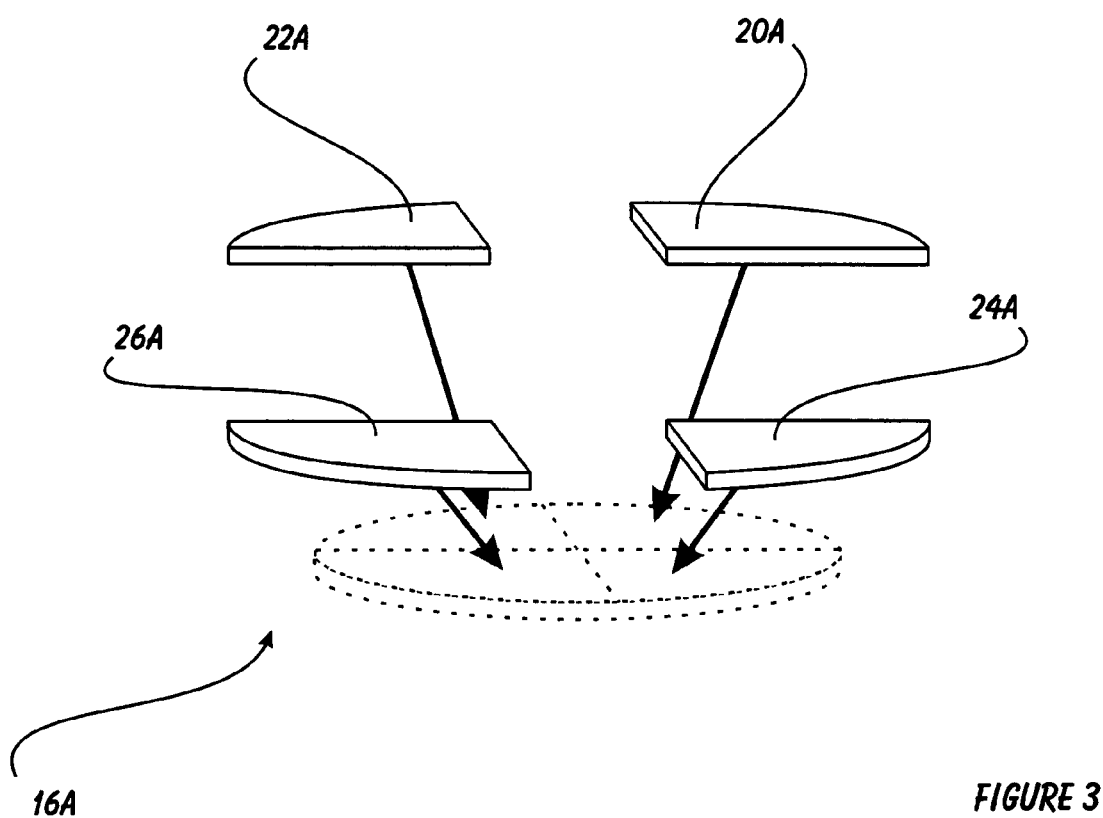
FIG. 3 is an exploded perspective view of the pad assembly of the device of FIG. 2.
Figure 4:
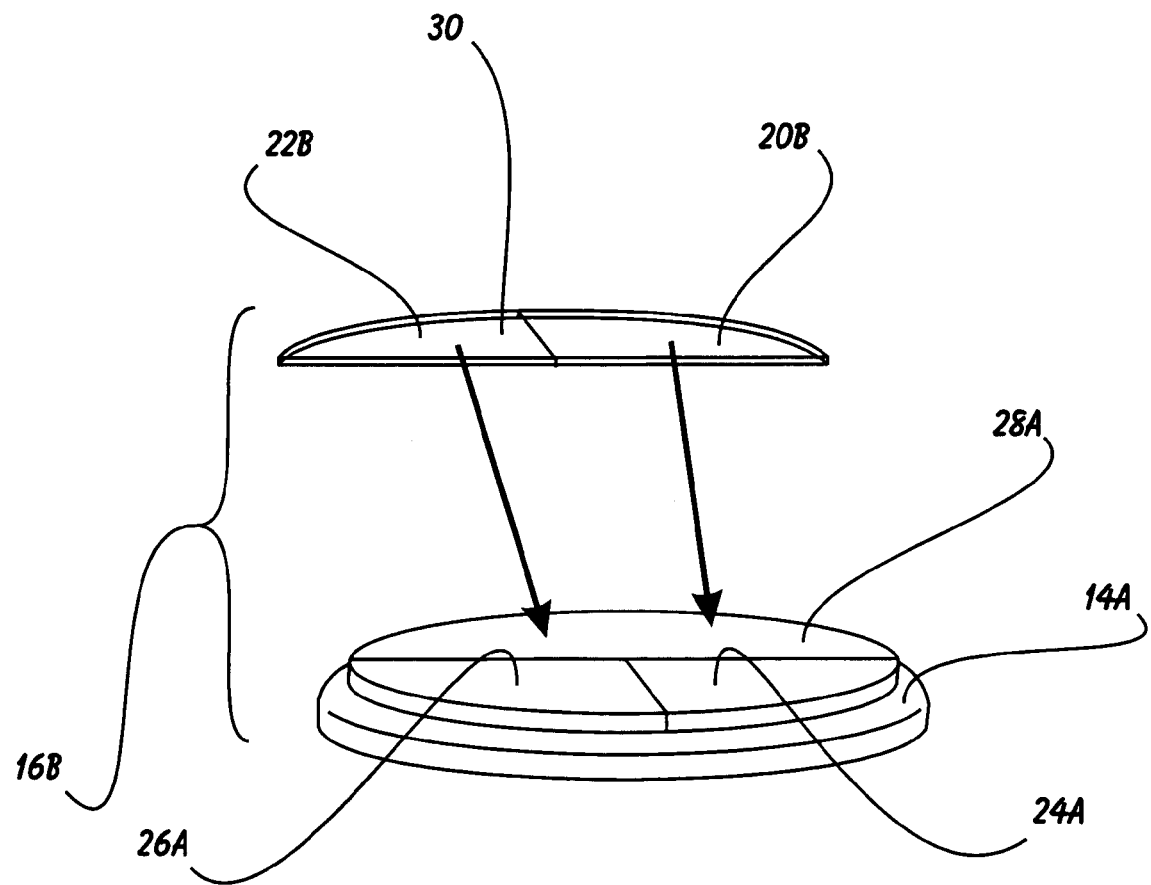
FIG. 4 is an alternate preferred embodiment of a pitch pad practice device of the present invention.

The inventor's practice devices disclosed herein teach the student to feel and hear and see the Music by using Light & Dark Colors, Top & Bottom Locations, and Textures of Hard & Soft surfaces that create High & Low Sounds respectively (see FIGS. 2, 3 and 4). Notice that the Harder Textures and Higher Pitch Sounds are located in the "Higher" Sections, and this coincides with the wrist's motion of raising the Drumstick "Higher" for playing Accented, Harder-hitting, and High Pitch Strikes. This special Drum-Pad allows the student's Audio Senses to reinforce the student's Visual and Tactile Senses so that they can see and feel their body's motion imitating the intensity of a High or Low Strike, and can see and feel their hand move towards High or Low Sections. So, by following a Color-Pattern and striking the Drum-Pad accordingly, the student will exaggerate his or her Accent Strikes regardless of the wrist's "strength" in striking, and thereby creating the correct Sound, Feel, and Look. In summary, all three senses work independently, but also all three senses work together.

| 3 Senses Working to Learn a Percussion Lesson: "Accented 4 Stroke Roll" | | | | |
| --- | --- | --- | --- | --- |
| Audio Senses - Count: | "1" | 2 | 3 | 4 |
| Audio Senses - Voice: | Louder | Quieter | Quieter | Quieter |
| Audio Senses - Tone: | Higher | Lower | Lower | Lower |
| Audio Senses - Strike: | Accent | Standard | Standard | Standard |
| Visual Senses - Location: | Top/High | Bottom/Low | Bottom/Low | Bottom/Low |
| Visual Senses - Colors: | Lighter | Darker | Darker | Darker |
| Visual Senses - Strike: | Accent | Standard | Standard | Standard |
| Tactile Senses - Body: | Stronger | Weaker | Weaker | Weaker |
| Tactile Senses - Texture: | Harder | Softer | Softer | Softer |
| Tactile Senses - Strike: | Accent | Standard | Standard | Standard |
| Tactile Senses - Motion: | Higher | Lower | Lower | Lower |

Each of these Senses works in many ways to contribute to the type of "Stroke" (or musical note) that is produced, (i.e., "Accent" vs. "Standard").

Within the Audio Senses, a student can simply hear the sound produced externally from the Practice Pad (or musical instrument). This "sound" produced is made either from the "strength" of the strike, or the material of the instrument being struck.

A student strikes the instrument within Stronger or Weaker motions in a cadence of Rhythm, (or Musical Lesson) while attempting to play the correct sequence, (i.e., 1 Accent Strike followed by 3 Standard Strikes). At this point the Audio Senses of the mind come alive in two modes: (1) Listening to the correct sequence of Accent and Standard Notes that are to be played; and (2) Distinguishing if what is being played is within the correct sequence. The Audio Senses are Listening for a "True Equation," and then Distinguishing if the "body-motion" is a True or False Equation. However, if the Audio Senses are to be utilized to Listen, rather than to Distinguish, the student must already have knowledge of striking within the correct sequence in order to produce the "True Equation" that the mind is seeking.

Therefore, the inventions disclosed herein are designed to automatically produce an audio cadence of Low and High Pitches (i.e., Standard and Accented Sounds) depending upon where it's struck. At least one of the disclosed Teaching Tools produces a Higher Pitch tone at the Top Sections (i.e., Accent) and Low Tones at the Bottom. Thus, regardless of the student's initial strength and/or accuracy of their body-motion, this Practice Pad will create an Accent "sound" when struck at the top, thereby creating a continuous True Equation to the Audio Senses and generate a higher Mental-Reflex.

Initially, we must first teach a student to learn a Sequence, and then contour this towards remembering a Rhythm. So, as we focus from a Sequence to a Rhythm, we must look at the Audio Senses, and also foresee the Tactile Senses. As a result, this Teaching Tool is constructed of different types of textures located at the Bottom and Top striking-surfaces to correlate to the Audio and Tactile Senses, and also coincide with the "High & Low" values of the Visual Senses. For example, the Bottom Quadrants are Softer Textures and allow the vibration created during the impact of the Strike to be "absorbed" more. As the physics of the total energy is released from this Bottom Section (Softer Texture) some energy is transitioned into a motion such as a vibration similar to a "bouncing formation," and other energy is released in the formation of "sound" and creates a Low Tone. On the contrary, the Top Quadrants (Harder Textures) create a different absorption of energy where the motion is released more as a "quick shock," rather than a continuous vibration and thereby creating a Higher Tone/Pitch of "sound." As a result, the action is confirming the sound, as the sound is confirming the action. As the Audio Senses "listen" and "distinguished" a true pattern of Rhythm, the Tactile Senses are also highlighted to further assist in this Mental Reflex Process. For example, the Softer Textures on the Bottom absorb more of the body's momentum and the motion is a vibration that is "felt" mostly by the Drumstick's rebound, or bounce. On the contrary, the Harder Textures on the Top Sections (Accent-Zone) repel the force of the Strike and tries to send the vibration back to the body's own mechanical absorption. This "motion" of energy is a "quick shock" type of vibration and is "felt" through the Drumstick and releases some of this energy back to its source, (i.e., the Hand and Arm of the Student). This Tactile stimulus reconfirms the Visual and Audio Senses of "teaching" the brain to "feel" the Music, (i.e., Student strikes . . . and the Music strikes back!) Accordingly, this "vibration-jolt" creates a Subconscious-Reflex of when to play the Accent Strike, (similar to Pavlov's Dogs' responsive actions).

Finally, the Visual Senses of the method of the present invention also focuses on "seeing" where the Targets are located (i.e., Bottom or Top), and "seeing" which Hand to use (i.e., Right or Left), and "seeing" the body-motion of the strike, and also "seeing" which Color to Strike, or even vocally Sing. Therefore, as we analyze how Visual Senses teach the Introductory Step of Music, we must also consider the next Music Step as well.

A second Teaching Tool for learning Music is the Pitch Plates apparatus (see FIG. 5). This instrument introduces a higher level of combining Rhythm and Pitch by further expanding the 2 Pitches into 4 Pitches. Therefore, the theory of the Color Spectrum becomes our transition of both Teaching Tools by using a "Visual" Sequential Scale of the four color-values that we discussed earlier: Darkest, Dark, Light, & Lightest, (i.e., Blue, Green, Red, & Yellow.)

The symbolic representation of each Quadrant is the inventor's initial step of teaching Music. This "Step" examines our Starting-Point and formulates an easy transition into our next "Step," towards the goal of educating children in music. Unlike today's modem Sheet-Music of black and white inscriptions, a student doesn't need to learn how to "Read," but rather how to analyze and distinguish a primary Visual Sense of Dark and Light Colors, (i.e., Blue & Green=Dark; and Red & Yellow=Light Colors). Therefore, the Practice devices of the present invention allow any student to begin making Music by simply following the colored-coded sections. Instead of counting "numbers" for representation of the Musical Pattern, the student vocally counts the "colors" in the sequence of the Music and strikes accordingly, and thereby reinforces the Tactile and Audio brain-activity. This $1^{st}$ Teaching Tool is designed to produce 2 Tones of Low and High Pitch. Furthermore, this $1^{st}$ Teaching Tool coincides with the transition to the $2^{nd}$ Teaching Tool that focuses on further dividing the 2 Tones into 4 Tones, and still keeps consist with the sequence of the color-values within both Teaching Tools.

| Lesson Book 1 – Learning Rhythm | | | | |
|---|---|---|---|---|
| Color | | Pitch | Texture | Location |
| Light | IV / III | High | Hard | High |
| Dark | II / I | Low | Soft | Bottom |

| Lesson Book 2 – Learning Pitch | | | | |
|---|---|---|---|---|
| Color | | Pitch | Texture | Location |
| Lighter | IV | Higher | Harder | Higher |
| Light | III | High | Hard | High |
| Dark | II | Low | Soft | Low |
| Darker | I | Lower | Softer | Lower |

The 2$^{nd}$ Teaching Tool is configured in a linear-scale similar to the linear keys of a Piano. Consequently, as we begin to teach a student the values of sound, the 1$^{st}$ Teaching Tool (either circular or in some other shape) illustrates the Low and High values within a logical Visual Sense, (i.e., Low-Tone located at the Bottom, vs. High-Tone located at the Top). However, this Visual Awareness of Low=Bottom and High=Top, is transitioned into a Mental Awareness within our 2$^{nd}$ Teaching Tool and illustrates that Music has a universal-direction of infinity. Thus, the Percussion Pitch Plates™ have an ascending or descending formation of Low Tones to High Tones and it's in a constant sequential order regardless of its direction. At this point we teach mind-awareness rather than visual-awareness, because a scale of Lowest to Highest Values exists despite the direction of the instrument. Therefore, the Pitch Plates device (see FIG. 5) can be easily turned to face any direction to provide a better understanding of Music, and easily transitions 1$^{st}$ Teaching Step to the 2$^{nd}$.

Four-Quadrant Assembly: Percussion Pitch Plates Device

| Pitch Plates: Descending Scale - Drums | Pitch Plates: Ascending Scale - Piano |
|---|---|
| Section: IV.   III.   II.   I. | Section: I.   II.   III.   IV. |

| Drum Characteristics | | | | Piano Characteristics | | | |
|---|---|---|---|---|---|---|---|
| Quadrant | Color | Tone | Hand | Quadrant | Color | Tone | Hand |
| Section I | Blue | Lowest Pitch | Right | Section I | Blue | Lowest Pitch | Left |
| Section II | Green | Lower Pitch | Right | Section II | Green | Lower Pitch | Left |
| Section III | Red | Higher Pitch | Left | Section III | Red | Higher Pitch | Right |
| Section IV | Yellow | Highest Pitch | Left | Section IV | Yellow | Highest Pitch | Right |

This example above shows that the Music Scale of Low and High Values is an "internal" awareness of the mind. However, the body-motion in making Music is actually a motor-skill, rather than an awareness, and must correlated to the "external" musical instrument. Therefore, each direction must coincide with the body-motion, (i.e., Descending Scale's Low Value=Right Hand; and Ascending Scale's Low Value=Left Hand).

The Teaching System disclosed herein uses two Teaching Tools to encompass a complete Music Learning Experience of Rhythm and Pitch by teaching the basics of two musical instruments such as Drums and Piano. Both Teaching Tools (i.e., Practice Pad with targets device and the Percussion Pitch Plates device) use the fundamentals of both instruments to compliment each other, such as ($1^{st}$) the Drums teach Rhythm and introduces Pitch, and ($2^{nd}$) the Piano teaches Pitch and further develops Rhythm.

As the student progresses from learning on the $1^{st}$ Teaching Tool to the $2^{nd}$ Teaching Tool the visual-sequence of color is consistent in both. The method of using motor-skills per each Teaching Tool is also consistent by utilizing the "Dominant Right Hand." For example, in playing a "4/4" Time Measure on the Drums, traditionally the Right Hand keeps the tempo and may strike the Drum "4" times compared to the Left Hand striking only "1" time. In a similar manner, when playing the Piano the Right Hand may strike the keys several times (i.e., playing the "Melody") while the Left Hand strikes just once (i.e., playing the "Chords"). Furthermore, the Drums are instruments that focus more on Low Tones, and the Piano focuses more on High Tones, similar to modern Music where the Drums play the Rhythm of the Song while the Piano plays the Melody.

Moreover, as we transition from the $1^{st}$ Teaching Tool to the $2^{nd}$ Teaching Tool, the placement of "symbols"(colors) and body-motion, must be in accordance to our Starting-Point, and also consistent to the goal of teaching music to children. Thus, the example below confirms that each color-value correlates to each Teaching Tool, and both are in sequence within the Dominant Right Hand body-motion. In addition, the $1^{st}$ Lesson is easily transitioned to the $2^{nd}$ Lesson.

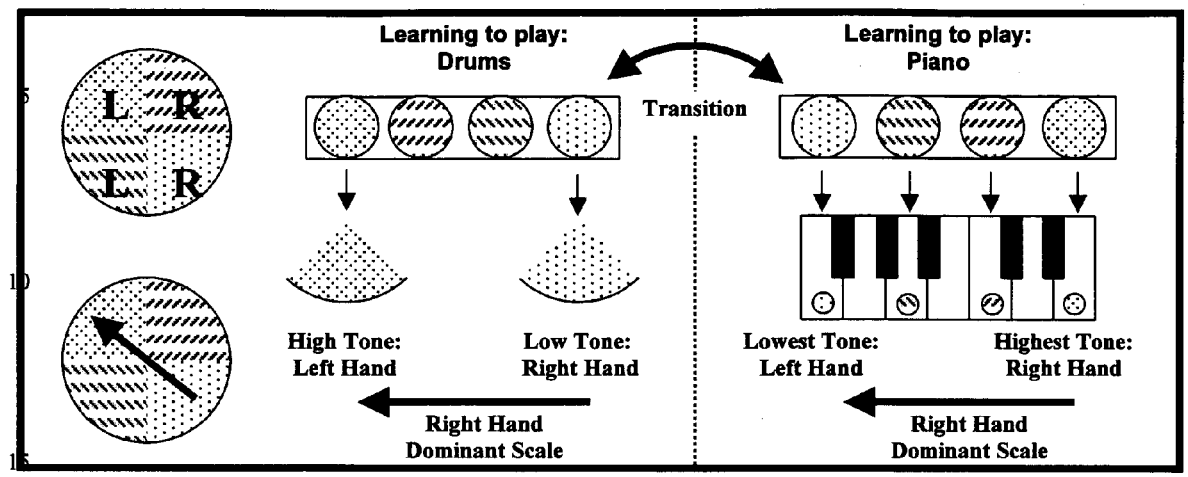

While a circularly-shaped target group is depicted here, it should be understood that other configurations are expected, including, but not limited to the hand-shaped targets discussed herein below.

As we review both Teaching Tools of the present invention, we must also consider the Striking Guide. As mentioned earlier the "black & white" inscriptions of today's musical script need to be "decoded" prior to "reading" and learning how to play. Therefore, the Striking Guide of the inventor's Teaching System uses the basic Visual Principles of distinguishing between "bigger" objects vs. "smaller" objects, along with visually distinguishing between Dark Colors and Light Colors, and thereby subconsciously learning to "read" Music. In traditional Music "reading," the music-notes within the music-script are formatted in two modes such as: (1) the symbolic time-duration of each musical note such as Half and Quarter Notes; and (2) each note's placement along the Musical Staff Bars to signify the level of its Pitch. However, as we've earlier seen, these definitions can be easily comprehended using primary visual-senses. For example, the Time Duration of each musical note can be viewed by the size difference per each note similar to the "dashes" and "dots" of Morse Code. Each note can be easily viewed as its "true" value in accordance to its size, and thereby creating Musical Training Wheels for each music-note's Time Value.

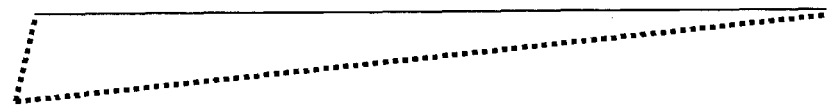

Similar to teaching Morse Code, when typing the Dashes and Dots on a Telegraph there must be consistency between both value's "quantity" of time between each stroke. Thus, the total overall speed of the complete message is irrelevant, but rather the consistency of time-value between the Dashes and Dots will allow the receiver to decipher the language. Likewise, in teaching Music our initial object is a student to understand the difference of time-value between two beats, regardless of the overall speed of the "Song." There needs to be a pre-step for a student to first comprehend his mind-to-body "internal" thinking, and then transposing this to an "external" motor-skill. Once the proper motor-skill is obtained, the student is now ready to comply with the overall speed of the song. For example, a modern-day song such as "Low Rider" from the 1960's band WAR, can be viewed within two different Time Measures: Actual Music-Script using a 4/4 Time Measure; and a "Learning" Striking Guide using a 1/1 Time Measure. Notice that the only difference is that the speed of the Learning Script is four times slower than the Actual song. However, we can see that the mind-to-body motor-skills in striking the instrument are identical within both types of Time Measures.

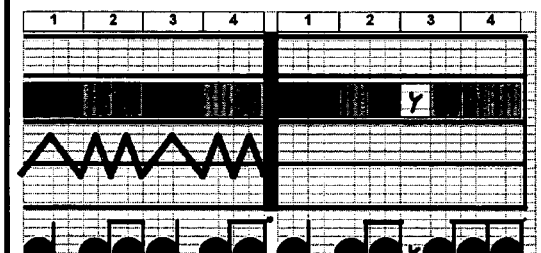

The above example is similar to teaching how to speak a foreign language. The teacher must slow-down the pronunciation of the "words" in order for a student to comprehend the motor-skills of the mouth and tongue that's needed to produce the correct sounds. Once the motor-skills of speaking particular "words" are learned, the student proceeds to speak them within a correct volume and speed of the language's proper pronunciation. At this point, let's now focus on the $2^{nd}$ definition within today's modem Music-Script that dictates each note's placement along the Musical Staff Bars to obtain Pitch. However, let's first examine our Introductory Step in learning Music. As mentioned earlier, the inventor's first Teaching Tool compliments a musical instrument such as the Drums in order to teach Rhythm. Therefore, as we scrutinize traditional modem Sheet Music for an instrument such as the Drums, we will notice that the elementary teaching of this instrument only uses 1 single Slot, (i.e., the $3^{rd}$ Slot of the Staff Bars). The variances in Pitch within this single Drum is within the Accent and Standard Strikes as mentioned earlier. As the student progresses, multiple other types of Drums are also utilized to create more levels of Pitch and expanding the amount of sounds produced. In doing so, each individual type of Drum is also denoted by a particular single placement along the Staff Bars, (i.e., Snare Drum=$3^{rd}$ Slot; Bass Drum=$1^{st}$ Slot; Floor Drum=$2^{nd}$ Slot; etc.)

Likewise, the inventor's Striking Guide initially only uses a single line of Musical Notations as well. The value of Pitches within a Musical Pattern is automatically produced by the mechanics of our Teaching Tools as previously shown. Therefore, in order to make Music the student simply follows the color-sequence of the Lesson, where each color-value is within a Sequential Scale consistent to the Musical Staff Bars, (i.e., Blue equals Lowest Pitch/Bottom Placement; and "Yellow" equals Highest Pitch/Top Placement of Staff Bars). Thus, the student is able to produce the sounds of the Music-Language, and subconsciously is learning to visually "read" by correlating the "Lower Colors" against the "Higher Colors."

Using a mind-to-body experience of the Visual, Audio, & Tactile Senses, the learning cortex of the brain corresponds to motor-skills and body-motions while learning how to play (or "speak") the Music-Language. Thus, the mind of the student subconsciously prepares for the next level of learning.

So, by reverse-engineering the characteristics within the flow of a traditional music-score compared to the inventor's Teaching System, we can reach our Goal of teaching any student with no musical knowledge how to comprehend Music and be prepared for today's modem Musical Notations. Then, the student can easily transition to an enhanced scale of 8 musical tones and understand the value of a Musical Octave.

Reverse-Engineering: Traditional Music to the Inventor's Teaching System
1. Traditional Musical Pattern can be transitioned into a Flow of Musical Colors
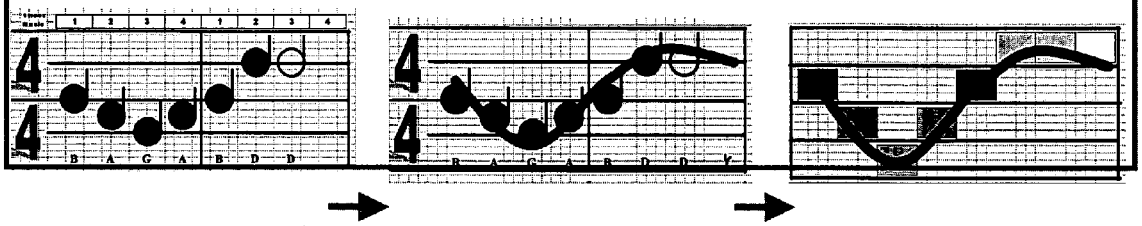
2. Same Musical Pattern can be transitioned into the inventor's Percussion Pitch Plates
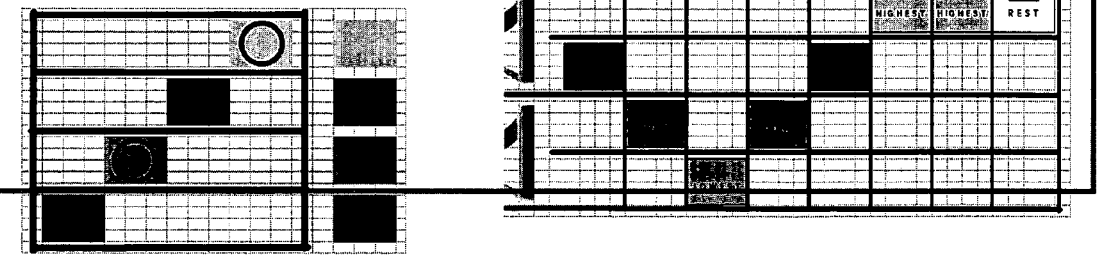

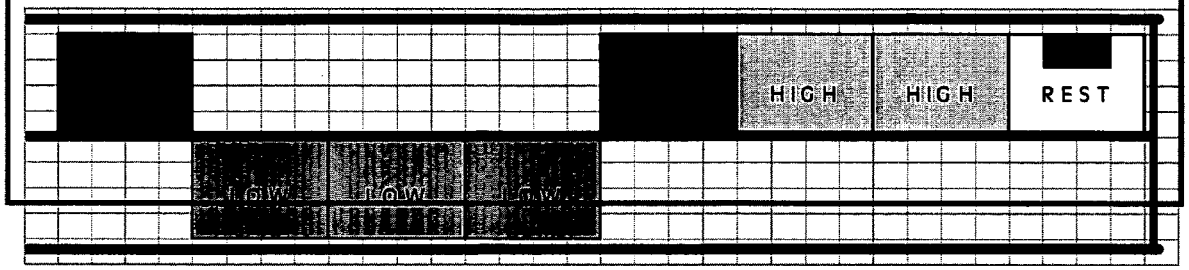
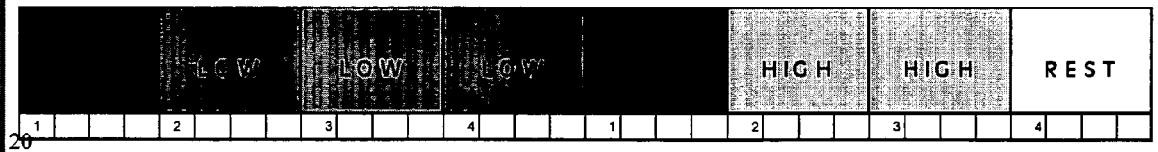

Specific Embodiments of the Invention

The present invention can best be understood by initial consideration of FIG. 1A. FIG. 1A is a flowchart depicting a first embodiment of the music teaching method 10A of the present invention. The method 10A begins with the teacher providing the student with a striking apparatus defined by two or more targets 100. Each target will display visual characteristics that are distinct from the others. The striking apparatus could be a drum, it could be a version of chimes or bells or it could simply be a type of striking pad or striking target.

Next, the teacher defines distinct audible pitches 102 after which each defined audible pitch is assigned to the targets which are dispersed on the striking apparatus 104. Next, the teacher prompts the user to strike the targets in an assigned sequence according to a provided striking guide 106. Of course, the earlier in the training process or the younger the student, the more rudimentary the striking guide will be.

Once the student demonstrates sufficient skill in striking the targets in accordance with the sequence assigned by the striking guide 108, the student will have achieved comprehension of musical notes corresponding to the targets (a major breakthrough) 112. The student then will repeat each lesson and/or practice executing the striking guide 114. Until the student demonstrates sufficient skill 108, the student will be prompted to continue to strike the targets in accordance with the striking guide using a variety of different striking guides and/or programs for striking 110.

Figure 1B:
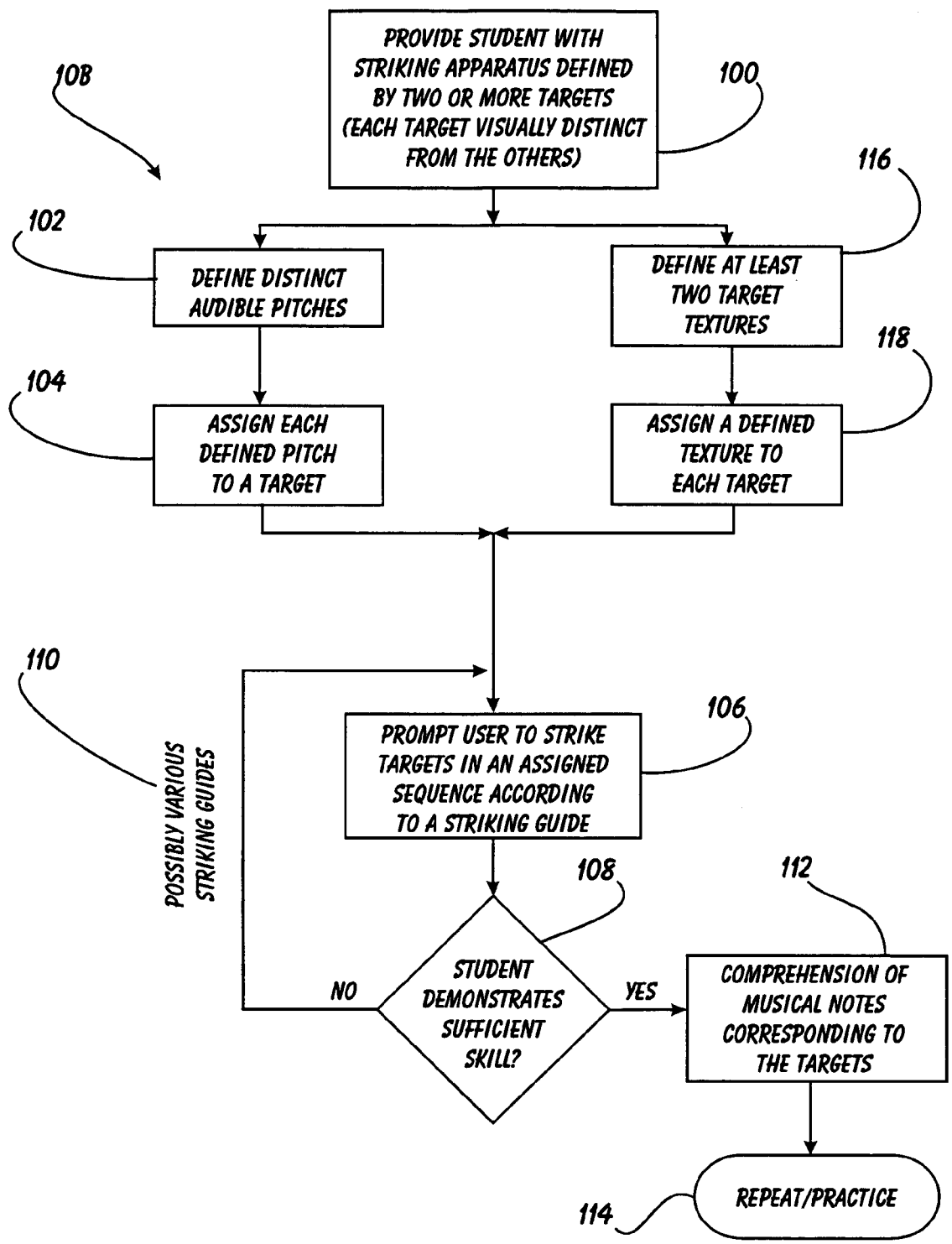

FIG. 1B depicts a method 10B that is very similar to that discussed above in connection with FIG. 1A. It adds the additional step of defining at least two target textures 116; the two or more targets dispersed on the striking apparatus will then each have a texture from the group of two or more textures 118. Adding the texture to the targets adds additional tactile sensation to the student's learning experience.

Figure 1C:
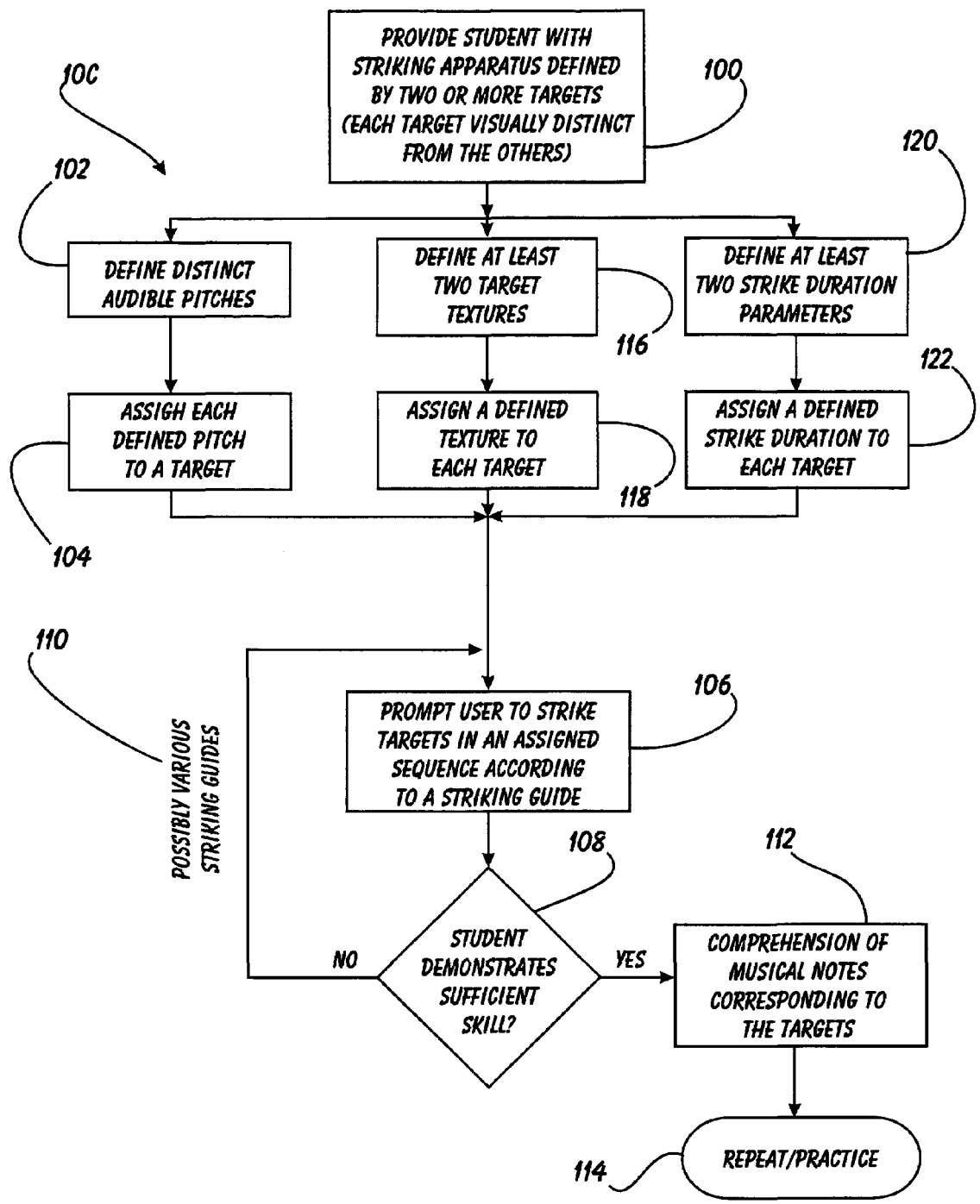

FIG. 1C depicts a method 10C that that builds upon the method of FIG. 1B by adding a step wherein at least two strike duration parameters are defined 120. Subsequently, a defined time duration is assigned to each of the targets 122. Adding the strike duration to the targets adds educates the student on the differences between musical note length (e.g. quarter notes, half notes, etc.).

By following the aforementioned methods, it has been found that even the youngest student can begin to pick up the relationship between music and pitch. As the student becomes more advanced, colors may also be attributed to each of the different targets to further develop the student's skills by correlating his or her sensing of audible pitch to his or her visual sensing of color, thereby to enable the student to recognize the differences in not only pitch, but also color. Each color then will be easily related to a unique musical note. If we now turn to FIG. 2, we can discuss one device designed to be used as the striking apparatus discussed above in the flowchart of FIG. 1.

FIG. 2 is a perspective view of a preferred embodiment of a pitch pad practice device of the present invention. The pitch pad practice device 12A of FIG. 2 has three main modules or elements. First there is the base 14A to which is attached a pad assembly 16A. Dispersed upon and/or designed into the pad assembly 16A is the target group 18A which is essentially a group of targets that the student will be prompted to strike. The target group 18A could be provided in a variety of different forms as should become apparent in the following drawing figures. Now turning to FIG. 3, we can begin to examine the various unique aspects of the pitch pad practice device 12A described herein.

FIG. 3 is an exploded perspective view of the pad assembly of the device of FIG. 2. The pad assembly 16 in this version of device 12A comprises four targets (either similarly-sized as shown, or in different sizes and shapes); a first target 20A, a second target 22A, a third target 24A and a fourth target 26A. Each target may have a visually distinct graphic and/or unique color inscribed upon it or incorporated throughout the depth of the target and/or each target may be made from a material that has a unique tactile characteristic as compared to the other targets in the target group 18A. The targets are assembled into the pad assembly 16A according to their musical pitch and hand movements, therefore, they will provide unique visual and tactile characteristics from one another. This will aid the student in building upon their musical knowledge through execution of the method discussed above in connection with FIG. 1.

For example, a target made of a harder material can be expected to flex less when struck with a hand or a stick than a target made from a softer material. Furthermore, the harder material will create an audibly distinct sound when struck. If we now turn to FIG. 4, we can see another version of the present invention.

FIG. 4 is an alternate preferred embodiment of a pitch pad practice device of the present invention. The alternate pitch pad practice device 12B here comprises a base 14A and an alternate pad assembly 16B. This pad assembly 16B has a target substrate 28 which may be made from one single piece of material or could be formed from two or more individual pieces assembled together similar to that discussed above in connection with FIG. 3.

Here the first target and the second target are formed and/or inscribed upon an overlay member 30. The overlay member 30 is formed from a piece of translucent or non-translucent plastic wherein the first target 20B and second target. 22B are painted and/or otherwise inscribed on the overlay member 30. The third target 24A and fourth target 26A, here, are of the same sort as they were in FIG. 3 above.

In another version, the first and second targets might be inscribed upon the substrate 28 and then viewed through the overlay member 30. In any case, the purpose of the overlay member is to create a hard, sharp-sounding material (when struck) so that the student can distinguish a strike to either the first or second target from a strike to either the third or fourth target. Another version of a practice device of the present invention is shown in FIG. 5.

FIG. 5A is a perspective view of a preferred embodiment of a pitch plate practice device of the present invention. The pitch plate practice device 32 comprises a base 14B and a target group 18B attached to the base 14B. In this case, the targets 20C, 22C, 24C and 26C are all metal plates of varying thickness and/or density. Furthermore, the targets will preferably bear or display a visually distinct graphic and/or color that is unique from the other targets. Since the metallic targets are of different thicknesses and/or different diameters, they each will emit a unique ringing note when struck. Each target is attached to the base 14B by a stem 34. The stems permit the targets to be struck and to vibrate without being dampened by a rigid attachment to the base 14B.

While the tactile sensation from striking each of these targets is only slightly distinct from the others, clearly the difference in sounds emitted from each target will, when coupled with the visual distinctions, such as color differences among the plates, provide substantial assistance to the student in distinguishing strikes on one target from strikes on another target.

FIG. 5B is a top view of the device of FIG. 5A, with a modification to the base 14B. Here, there are staff bars 35 displayed or inscribed upon the base 14B to further emulate a musical staff bar within which written notes are placed in written musical scores. Said targets can be placed within the position of the musical notes F, A, C, & E. This will aid the student in building their musical knowledge through execution of the method in connection with FIG. 1. A device this is somewhat of a blend between the device of FIG. 5 and the device of FIG. 4 is depicted below in connection with FIG. 6.

Figure 6:
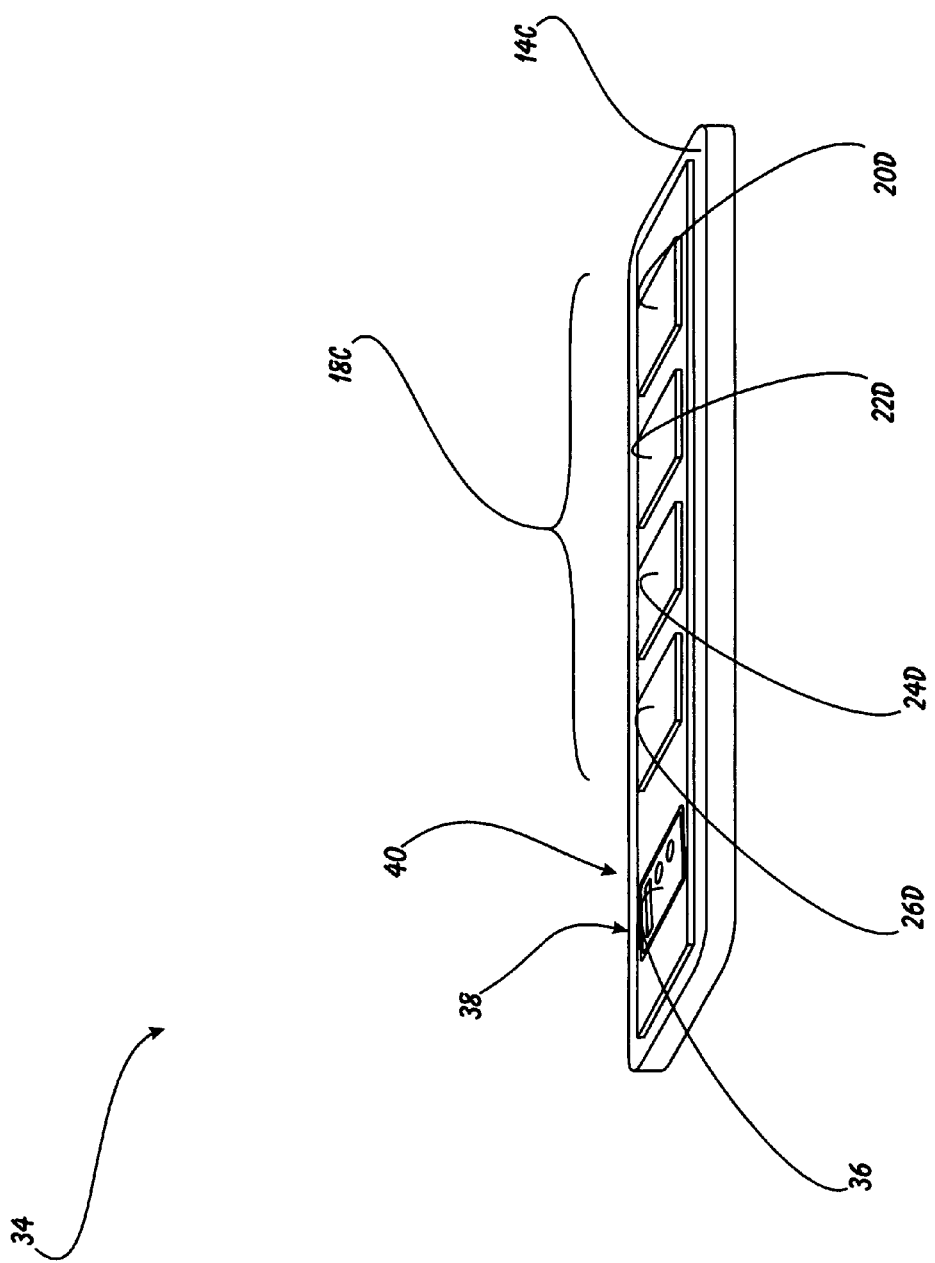
FIG. 6 is a perspective view of a preferred embodiment of a pitch pad practice device having an integrated cadence generating assembly.

FIG. 6 is a perspective view of a preferred embodiment of a pitch pad practice device having an integrated cadence generating assembly. The pitch pad having integrated cadence generator 34 of FIG. 6 has a base 14C and a target group 18C attached or otherwise dispersed thereon. These targets 20D, 22D, 24D and 26D are made from non-metallic material to provide a degree of sound or pitch when a stick is struck against the target.

In another version, these materials can be expected to be very similar to those discussed above in connection with FIGS. 2, 3 and 4. What is unique here is that in addition to the targets 20D, 22D, 24D and 26D, there is also a cadence generating assembly 36 attached or otherwise associated with the base 14C. Cadence generating assembly 36 provides the user with a user-selectable cadence to prompt the user when to strike the targets.

In this case, the assembly 36 has a visual signal transmitter 38 as well as an audio signal transmitter 40. Other devices may have only the visual signal transmitter 38 or only the audio signal transmitter 40. The visual signal transmitter 38 could be a light to the side of the targets, it could be another visual indication actually remote or some distance away from the base and targets, or it could be a light or other visual indication adjacent or surrounding each individual target or underneath the target (i.e. translucent target). We will now turn to FIG. 7 to discuss yet another embodiment of the device of the present invention.

Figure 7:
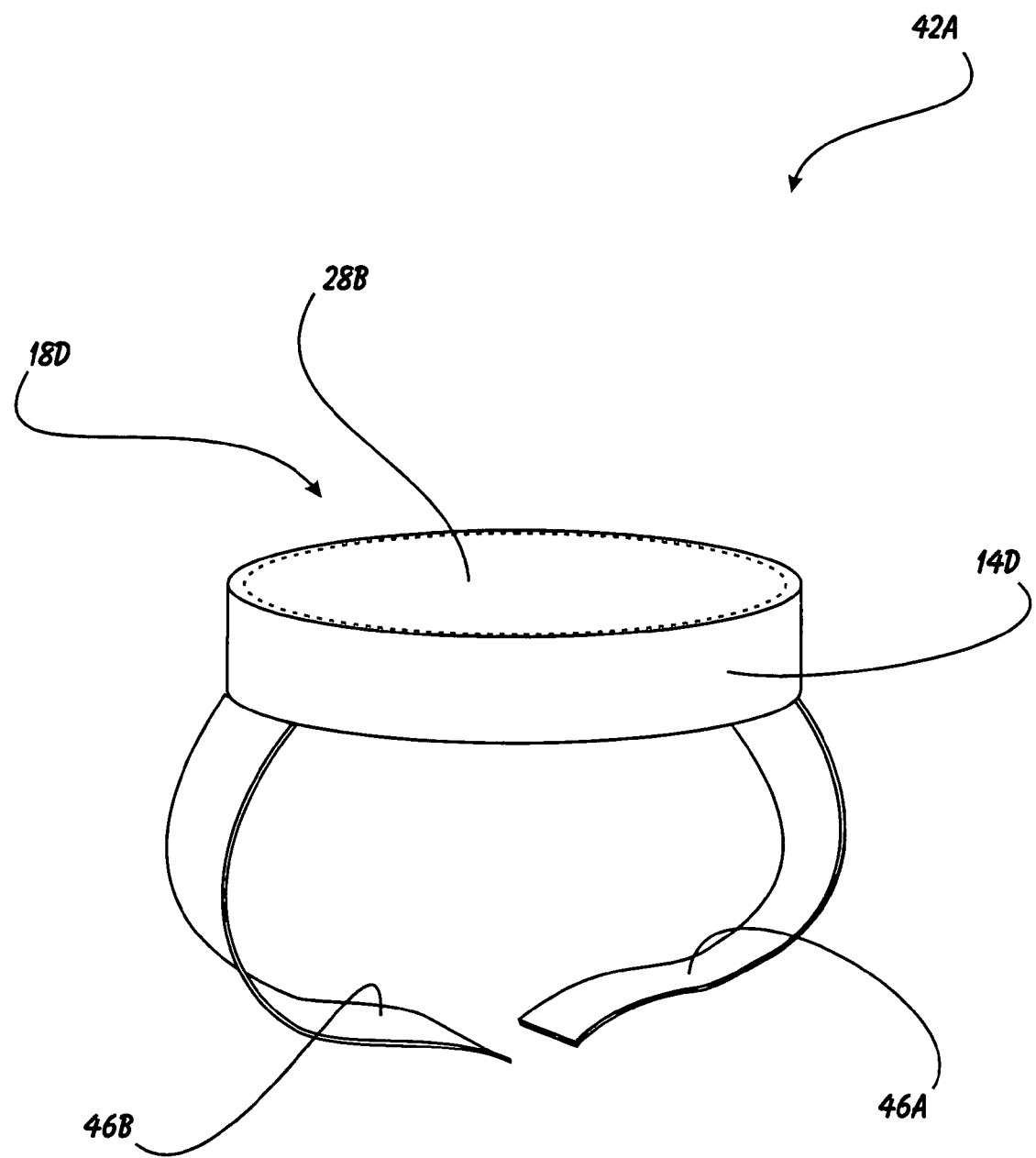
FIG. 7 is a preferred embodiment of a conga drum practice device of the present invention.

FIG. 7 is a preferred embodiment of a conga drum practice device of the present invention. The conga drum practice device 42A comprises a base 14D to which is attached an alternate target substrate 28B. The substrate 28B could be a conventional drum substrate member or it could be some other flexible membrane that the user stretches across the top perimeter of the ring that is the base 14D. There are a pair of straps, a first strap 46A and a second strap 46B that may be provided extending downwardly from the base 14D so that the user can interconnect the ends of the straps 46 beneath their legs whereby the device 42A will be retained securely to the user's legs while the device 42A is being used. In other embodiments, the strap may be a single continuous loop reaching from one side of the base 14D to the other, and through which the student can slip his or her legs (the strap would typically be made from an elasticized material). In other versions, the strap may be eliminated, or made be detachable. The substrate 28B will preferably have a target group 18D dispersed across its outer surface. The targets of this embodiment 42A are discussed in FIG. 8.

Figure 8:
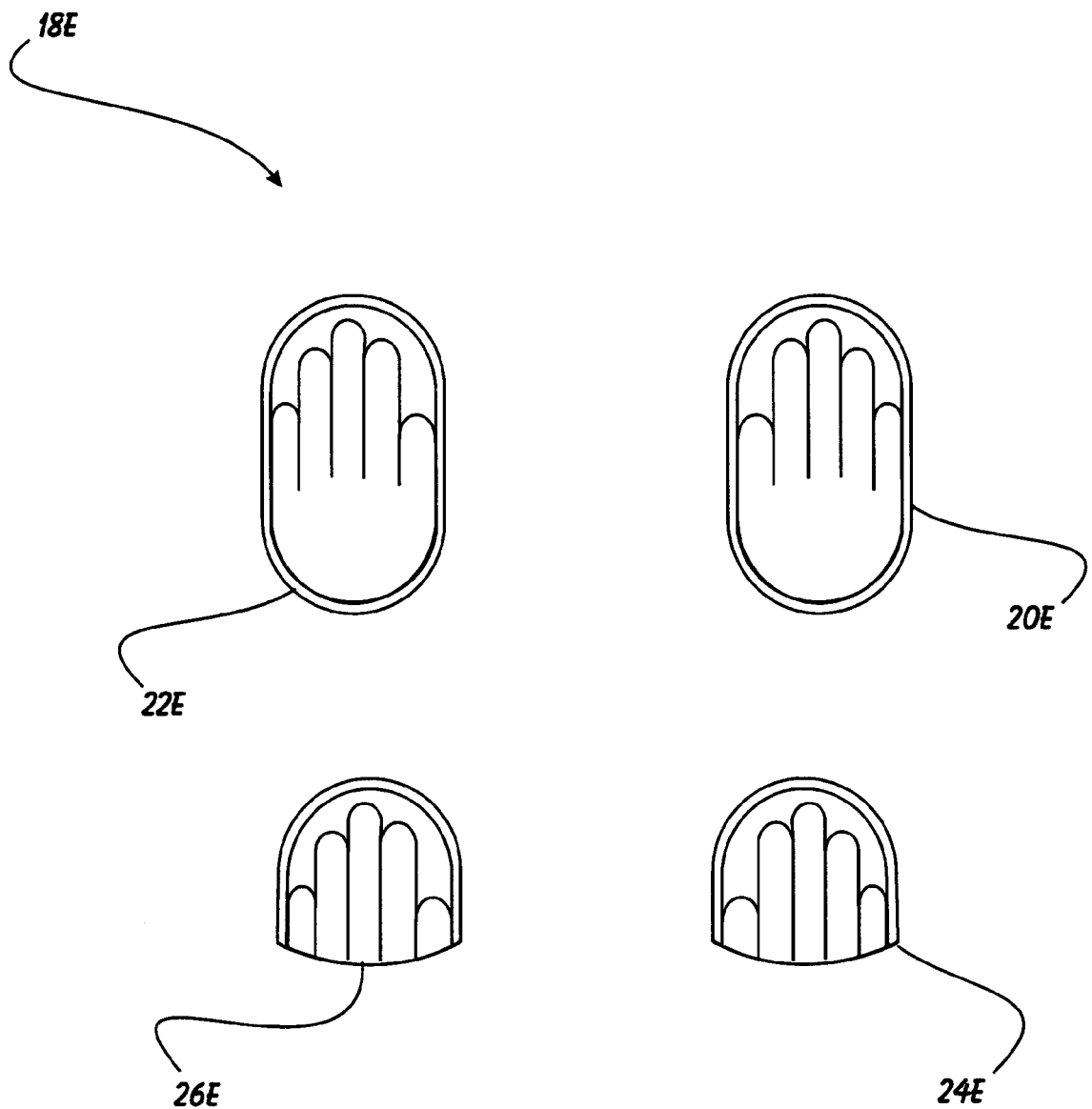
FIG. 8 is an exploded perspective view of the targets of the device of FIG. 7.

FIG. 8 is an exploded perspective view of the targets of the device of FIG. 7. In this version, the first target and second target 20E and 22E, respectively, are decals or inscriptions that are artistically shaped to provide the user with a connotation of a full hand. The third target and fourth target 24E and 26E are made from similar material to the first and second targets, but they are only intended to depict the fingertip portions of the human hand.

Each of the targets may very likely be provided with a visually distinct graphic inscribed upon it, and/or in a unique color such that it can be used in the execution of the method described above in connection with FIG. 1. Furthermore, these targets can be attached not only to the device depicted above in FIG. 7, but also to any flat surface that the user wishes to use as a striking apparatus. The location that is recommended by the inventor, if the targets are being attached to the device of FIG. 8, is depicted below in connection with FIG. 9.

Figure 9:
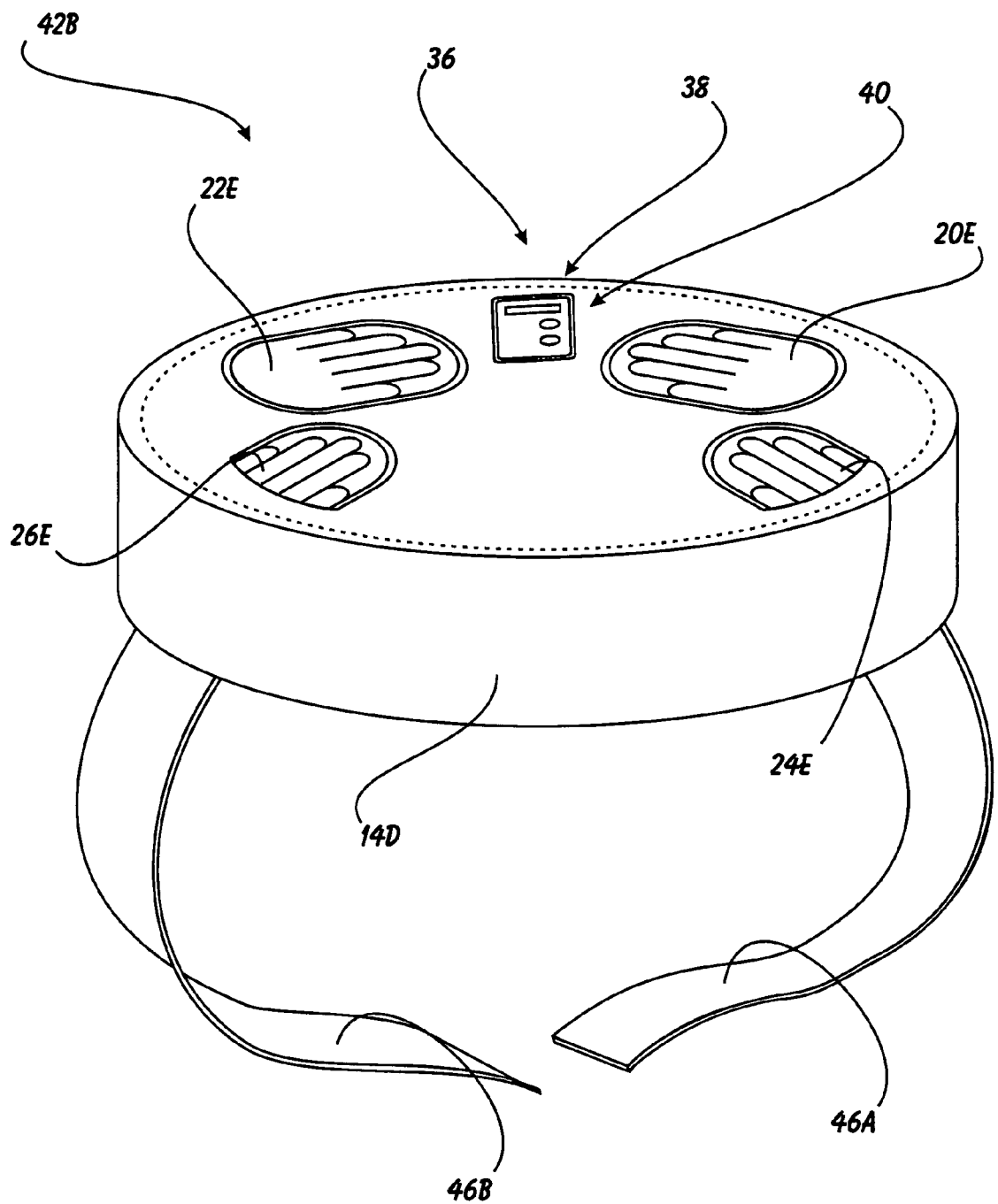
FIG. 9 is a perspective view of a preferred embodiment of a conga drum practice device having an integrated cadence generating assembly.

FIG. 9 is a perspective view of a preferred embodiment of a conga drum practice device having an integrated cadence generating assembly. The alternate conga drum practice device 46B shown here is essentially based upon the device of FIG. 7. It has a base 14D and a substrate member 28D as well as a pair of straps 46A and 46B. Dispersed on the substrate member the targets of FIG. 8 are depicted here.

Also provided in this device 42B is the cadence generating assembly 36 that was discussed above in connection with FIG. 6. This cadence generating assembly may have an audio signal transmitter 40 as well as the visual signal transmitter 38 and the visual signals may be a liquid crystal display on the cadence generating assembly 36 or it could be as complicated as lights being displayed through translucent portions of the substrate 28B, such as in the vicinity of the targets shown here. In other versions, the targets may actually be painted or otherwise permanently inscribed upon the substrate 28B, or even next to the target as well, rather than using the removable stick-on targets discussed above in connection with FIG. 8.

The audio signal transmitter 40 may be a speaker on the assembly 36 or it may be the pair of headphones connected to the assembly 36 such that the user receives an audio strike signal from the transmitter 40 privately to his or her ears or to external audio hardware.

Figure 10:
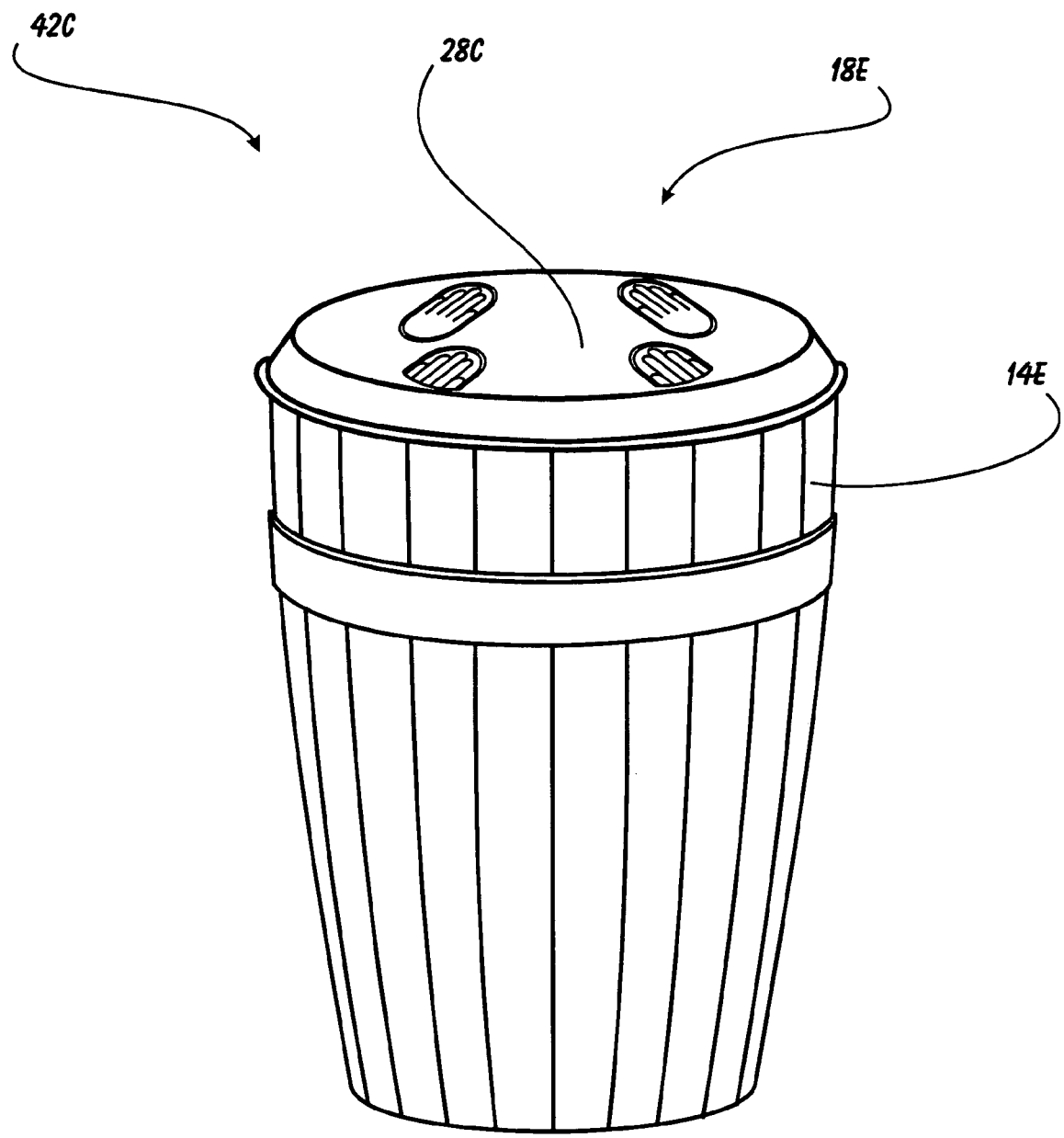
FIG. 10 is a perspective view of another preferred embodiment of a conga drum practice device of the present invention.

FIG. 10 is a perspective view of another preferred embodiment of a conga drum practice device 42C of the present invention. Here, the device 42C is an actual conga drum that has been modified by adding or inscribing a target group 18E onto the substrate 28C (i.e. the conga drum head). The base 14E is the frame of the drum. Addition of the targets 18E to the head 28C enable the student to use a conventional drum with the teaching method discussed above in connection with FIGS. 1A-1C.

Figure 11:
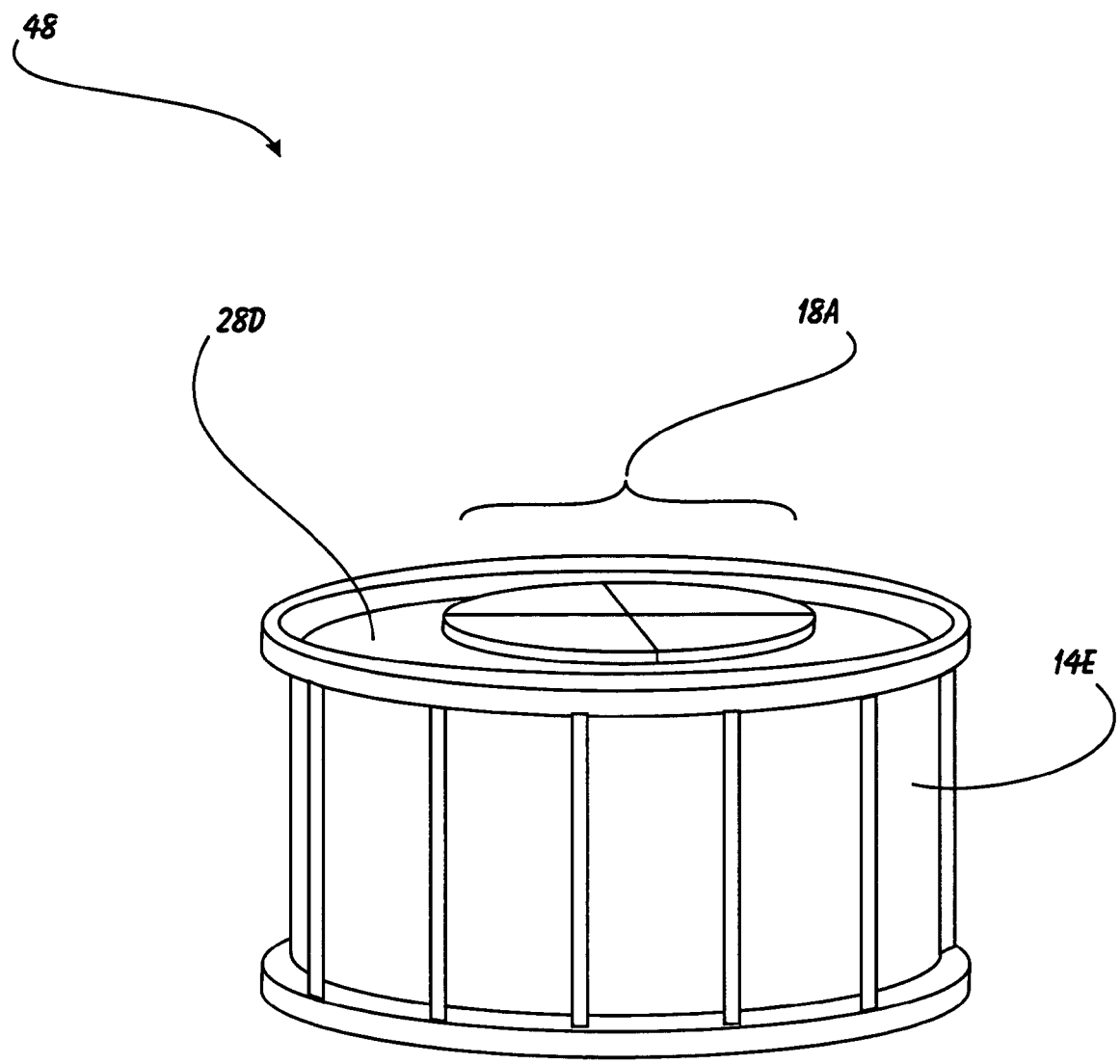
FIG. 11 is a perspective view of yet another preferred embodiment of a practice device of the present invention.

FIG. 11 is a perspective view of yet another preferred embodiment 48 of a practice device of the present invention. Here, a conventional snare drum has been converted for use with the method discussed above. The substrate 28D (snare drum head) has a target group 18A (i.e. of similar shape and color design as in FIGS. 2, 3 and/or 4) attached to it to enable a student to use their drum set with the teaching method of the present invention. While the target group depicted here is of the sort discussed above in connection with FIGS. 2, 3 and 4, it should be understood that the target group could also be formed as a decal applied to the substrate 28D, or further the target group could be applied in some indelible way to the substrate 28D (i.e. painting, etc.)

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A drum practice device, comprising:
   a base;
   a resilient substrate member attached to said base, wherein said resilient substrate member is attached to said base over an upper edge of said base; and
   two or more targets dispersed on said substrate member, wherein said targets comprise decals attached to an upper surface of said substrate member,
   wherein said targets comprise a first target of a first visually distinct appearance and a second target of a second visually distinct appearance, and
   wherein said first and second targets are images approximating human handprints.

2. The device of claim 1, further comprising at least one flexible strap extending from said base.

3. The device of claim 1, wherein said base is defined by a generally circular outer wall having said upper edge and a lower edge, said wall surrounding a hollow center portion.

4. The device of claim 2, comprising a pair of said flexible straps, said straps extending downwardly from said outer wall, said straps further comprising attaching means for attaching distal ends of said straps to one another.

5. The device of claim 1, wherein said targets comprise a third target of a third visually distinct appearance and a fourth target of a fourth visually distinct appearance.

6. The device of claim 5, wherein said third and fourth targets are images approximating a finger portion of a human handprint.

7. A striking target group, comprising:
   a first target defining a first visually distinct appearance;
   a second target defining a second visually distinct appearance; and
   wherein said targets are further defined by a shape approximating a human hand.

8. The group of claim 7, wherein said first and second targets are formed from thin flexible materials.

9. The group of claim 7, further comprising:
   a third target defining a third visually distinct appearance; and
   a fourth target defining a fourth visually distinct appearance.

10. The group of claim 9, wherein said third and fourth targets are formed from thin flexible material and are further defined by a shape approximating the four fingers of a normal human hand.

11. The group of claim 7, wherein each said target comprises a top surface and a bottom surface, said bottom surface further comprising an adhesive applied thereto.

12. The group of claim 9, wherein said targets are formed from a thin plastic material.

13. The group of claim 9, wherein each said target comprises a top surface and a bottom surface, said bottom surface further comprising an adhesive applied thereto.

14. A drum practice device, comprising:
    a base;
    a resilient substrate member attached to said base, wherein said resilient substrate member is attached to said base over an upper edge of said base; and
    two or more targets dispersed on said substrate member, said targets being inscribed on an upper surface of said substrate member.

15. The device of claim 14, further comprising at least one flexible strap extending from said base.

16. The device of claim 14, wherein said base is defined by a generally circular outer wall having said upper edge and a lower edge, said wall surrounding a hollow center portion.

17. The device of claim 15, comprising a pair of said flexible straps, said straps extending downwardly from said outer wall, said straps further comprising attaching means for attaching distal ends of said straps to one another.

18. The device of claim 14, wherein said targets comprise a first target of a first visually distinct appearance, a second target of a second visually distinct appearance, a third target of a third visually distinct appearance and a fourth target of a fourth visually distinct appearance.

19. The device of claim 18, wherein said first and second targets are images approximating human handprints.

20. The device of claim 19, wherein said third and fourth targets are images approximating a finger portion of a human handprint.

21. A drum practice device, comprising:
    a base;
    a resilient substrate member attached to said base; and
    two or more targets dispersed on said substrate member,
    wherein said targets comprise a first target of a first visually distinct appearance, a second target of a second visually distinct appearance, a third target of a third visually distinct appearance and a fourth target of a fourth visually distinct appearance; and
    wherein said first and second targets are images approximating human handprints.

22. The device of claim 21, wherein said third and fourth targets are images approximating a finger portion of a human handprint.

* * * * *